United States Patent [19]

Cahoon et al.

[11] Patent Number: 4,563,713
[45] Date of Patent: Jan. 7, 1986

[54] METHOD AND APPARATUS FOR POSITIONING AND INDEXING READ/WRITE ON A MULTIPLE TRACK RECORDING MEDIUM

[75] Inventors: Dale L. Cahoon; Larry D. Zolnosky, both of Sunnyvale, Calif.

[73] Assignee: Xebec, San Jose, Calif.

[21] Appl. No.: 396,696

[22] Filed: Jul. 9, 1982

[51] Int. Cl.[4] .............................................. G11B 21/02
[52] U.S. Cl. ....................................... 360/75; 360/77; 360/78
[58] Field of Search ............................. 360/75, 77, 78

[56] References Cited

U.S. PATENT DOCUMENTS

| | | | |
|---|---|---|---|
| 4,371,902 | 2/1983 | Baxter et al. | 360/75 |
| 4,376,961 | 3/1983 | Torii et al. | 360/106 |

Primary Examiner—George G. Stellar
Attorney, Agent, or Firm—Thomas E. Schatzel

[57] ABSTRACT

Method and apparatus are provided for positioning a read/write head for transferring information between the head and a magnetic tape containing a plurality of information containing tracks. First and second opposed edges of a reference signal on the recording medium are located, and the locations of the first and second edges are used to calculate the position of the centerline of the reference signal. The centerline position is then utilized for accurate location of information - containing tracks on the recording medium. If no reference track is detected, reference signals are written on the medium, and the reference track location is stored in memory. The apparatus includes a drive means and a head means for reading/writing information, and the head means as indexing means to detect the edges of the reference signal.

18 Claims, 2 Drawing Figures

METHOD AND APPARATUS FOR POSITIONING AND INDEXING READ/WRITE ON A MULTIPLE TRACK RECORDING MEDIUM

SUMMARY OF THE INVENTION

The invention relates to a method and apparatus for positioning a read/write head for transfer of information between the head and a magnetic tape containing a plurality of information containing tracks. The head is indexed to locate a reference track at the beginning end of the tape. The read/write head scans the beginning of the tape and if a reference track is present, locates the lower edge and upper edge of the reference track and then the centerline of the track is determined. The accurate location of the centerline of the reference track provides a means for accurate positioning of the read/write head at the centerline of any one of the plurality of tracks, since the centerlines of the plurality of the tracks are accurately established relative to the previously precisely located reference track centerline. If the tape is not pre-recorded, a reference track is written at the beginning end of the tape which provides a reference point to position the read/write head at any selected one of the multiple tracks on the tape.

BRIEF DESCRIPTION OF THE INVENTION

Figure 1:
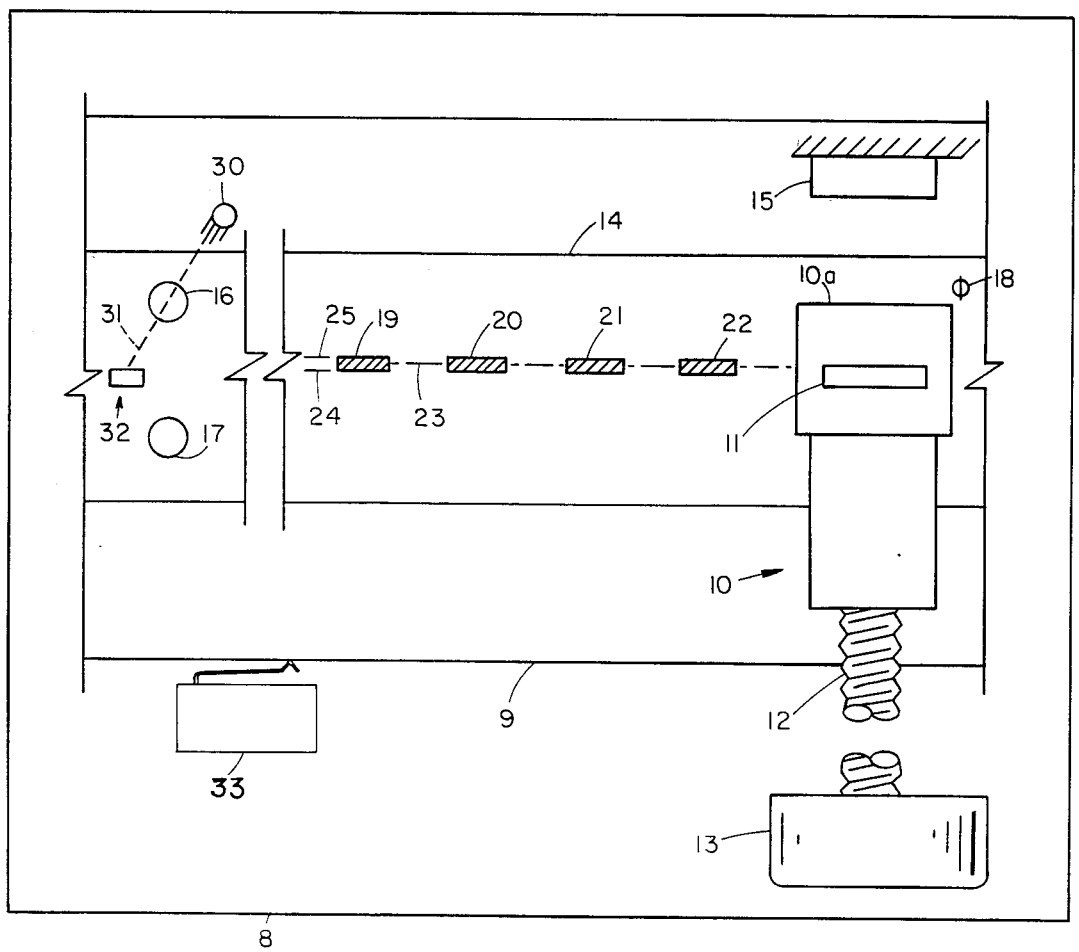
FIG. 1 is a schematic view showing the apparatus, the read/write head and indexing mechanism for positioning the read/write head at the centerline of the reference track on a recording medium contained in a cartridge.

Referring to FIG. 1 of the drawing, there is schematically shown a tape driven means 8, cartridge 9 and an indexing read/write head 10. The head means 10 has a read/write head 10a which includes a core 11. A lead screw 12, connected with a stepper motor 13 is provided to vertically move the head along the path of travel perpendicular to the magnetic tape medium 14. A head stop 15 is provided to limit the upper travel of the head 10.

The magnetic tape 14 travels from right to left for reading and writing and is mounted in the conventional cartridge 9. The magnetic tape may be one quarter inch magnetic recording tape, having a length of approximately 450 feet. The cartridge 9 in which the tape is mounted comprises two coplanar hubs loaded with the 0.250 inch wide magnetic tape. Sensor switch 33 provides an indication as to whether the cartridge is in place. For example, nine tracks may be available on a tape which are 24 incremental steps of 0.001 inch/step or 0.024 inch center to center. The tape includes apertures or holes 16 and 17 which signify the beginning of tape (BOT). An early warning (EW) aperture or hole 18 designates the amount of space on the tape which is designated for recording the reference signals 19, 20, 21 and 22. The centerline of the reference signals 19, 20, 21 and 22 are designated by line 23. Each reference signal is about 0.010 inch wide, 1.0 inch long and is spaced about 1.80 inches from the next reference signal.

In the described embodiment, the lead screw 12 and stepper motor 13 have 0.001 inch step resolution. The maximum travel of the head 10, in the described embodiment, is preferably about 0.300 inches.

The tape drive means 8 includes a conventional motor for moving the tape 14 from right to left for reading and writing on the tape. It is understood that the tape drive means also includes a rewind mode to rewind the tape by rotating the spools in the cartridge 9.

Figure 2:
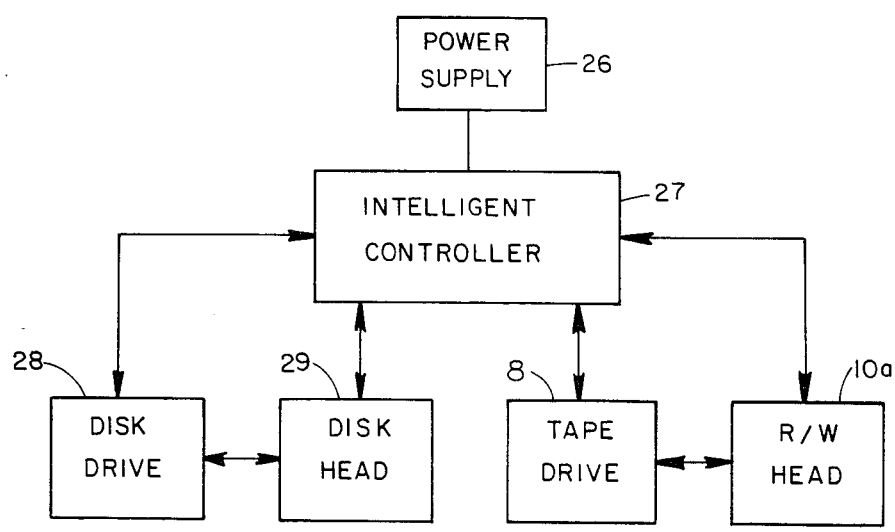
FIG. 2 is a block diagram showing the apparatus.

As shown in FIG. 2, the apparatus includes a power supply 26, which supplies power to the apparatus. It is understood that the power supply is connected to a source of electricity. The apparatus also includes an intelligent controller 27, which controls the function of the apparatus. Connected with the intelligent controller 27, is a disk drive 28 which may be of the type which drives a recording medium, such as a Winchester type disk. The disk drive 28 is connected with a disk head 29 for reading and writing information on a recording medium on the disk drive. The apparatus further includes the tape drive 8, which drives the recording medium 14 past the read/write head 10a. The tape drive 8 and read/write head 10a are connected to the intelligent controller, which in turn interrelates their actions with the disk drive 28 and disk head 29, which are also connected with the intelligent controller. The intelligent controller acts as a control means for actuating the disk drive 28, disk head 29, tape drive 8 and read/write head 10a.

A detecting means is provided to detect the hole 16, 17 and 18 in the recording medium. The detecting means may take the form of one or more light sources and light sensors. As shown in FIG. 1, this may include a light emitting source 30, which passes a beam of light 31 through the holes, which is detected by a light detection means 32. It is understood that similar detecting means are also provided for the holes 17 and 18, as are required.

The operation of the automatic head alignment is actioned by the intelligent controller 27 interacting with tape drive means 8, head means 10, stepper motor 13, and tape position sensing provided by light detection means 32. It is understood that a tape cartridge 9 is positioned in tape drive means 8. The intelligent controller automatically sequences to seeking for the reference signals 19, 20, 21 and 22 on application of electrical power to the mechanism or prior to the first tape operation after a new cartridge has been inserted (if no cartridge is present when power is applied). No other external stimulus is required. The following sequence of steps is executed by the intelligent controller during a typical head alignment procedure. The cartridge 9 is rewound so the tape medium 14 is positioned with BOT holes 16 and 17 adjacent to head 10. Stepper motor 13 is then pulsed so as to cause lead screw 12 to rotate and move head 10 vertically upward a sufficient distance to force head 10 against stop 15. In this mechanism a sequence of 300 steps is required. This position for head 10 is the fixed reference point for all vertical positioning during head alignment. From this position the head 10 is stepped in a downward direction a known number of steps so as to be positioned below the reference signals 19, 20, 21 and 22. Any time the head is stepped down, it is stepped 8 steps past where it is desired to end up and then stepped back up 8 steps to eliminate backlash.

From this known position relative to the head stop 15 steps are taken to accurately locate the bottom edge, then the top edge of reference signals 19, 20, 21 and 22. By utilization of algorithms stored in the intelligent controller these positions can nominally be found to an accuracy of ±1 step resolution (for this mechanism ±0.001). Head 10 is electrically connected to conventional electronics which detect the presence or absence of a data signal as tape 14 within cartridge 9 is caused to move from BOT holes 16 and 17 to EW hole 18 where tape motion is stopped. The head is stepped one step upward while stopped with the tape positioned at EW hole 18. The tape is then rewound to BOT holes 16 and 17. Again the tape is caused to move from BOT holes 16 and 17 while head 10 monitors the data detect signals 19, 20, 21 and 22. This operation is repeated, stepping head 10 up one step resolution for each iteration until the presence of the reference signals 19, 20, 21 and 22 are detected by head 10. The position of the bottom of the reference track is now known relative to the head stop 15. The value (RB) is saved by the intelligent controller in memory and the head alignment operation is continued. The top of the reference track is located by continuing to step the head upward in single step resolution increments as outlined above. As tape 10 runs from BOT holes 16 and 17 to EW hole 18, head 10 now monitors the data detect signal and will stop stepping the head when the data detect signal caused by reference signals 19, 20, 21 and 22 is no longer present. This known position relative to head stop 15 is the top edge of reference signals 19, 20, 21 and 22. This value (RT) is saved by the intelligent controller. The centerline of the reference track can now be calculated by firmware circuitry by the following equation:

$$\frac{RT - RB}{2} + RB = \text{centerline of the reference track.}$$

RT is the top edge of the reference track and RB is the bottom edge of the reference track.

The reference track centerline 23 was initially written at a fixed relative position to head stop 15. All subsequent operations are indexed to the centerline of the reference track and not to head stop 15 if the automatic head alignment procedure performed by the intelligent controller located a reference track on this cartridge.

This procedure does not transfer data or rely on reading data from the tape to perform the head alignment. Instead it uses the data detect signal to perform a time data envelope analysis, which incorporates digital filtering techniques to insure accurate location of the bottom and top edges of the reference track which locates track four of a nine track (zero-eight) configuration. On a nine track configuration the centerlines of the nine track are spaced (in inches) as follows: track zero is zero, track one is 0.024, track two is 0.048, track three is 0.072, track four is 0.096, track five is 0.120, track six is 0.144, track seven is 0.168 and track eight is 0.192. The location of the lower and upper edges of the reference track can be determined by scanning the tape between the BOT hole 18 and the early warning hole 18, approximately twenty-five times, with the read/write head 10 being stepped 1 step (0.001 inch) for each scan. This "shoeshining" detects the lower edge of the reference track so that this location is stored in the memory. The stepping upwardly of the head 10, with the scanning of the tape between the BOT holes 16 and 17 and the early warning hole 18, determines when the upper edge 25 is located. This position is also stored in the memory. The calculation, as set forth above, is performed which determines the centerline of the reference track. This calculation (averaging step) eliminates tolerances which are present in the read portion of the head, the write portion of the head and the gap between the read and write portions of the head. Once the reference track has been located, the locations for other tracks will be known.

If there is no reference track on the tape, reference signals 19, 20, 21 and 22 (at positions previously established in memory) are written at the reference track location. Additional information can then be written on the nine tracks of the tape using the location of the reference track as a starting point. Assuming no reference track is found during the scanning operation discussed above, the cartridge is rewound to the first set of the BOT holes 16 and 17. The head 10 is then stepped upwardly by the lead screw 12 and stepper motor 13 a sufficient number of steps (300 in the described embodiment) to insure that it is up against head stop 15. The head stop 15 determines the upward most position of the head 10.

The steps required to write a reference track on tape 14 are as follows. The tape is rewound to the first set of BOT holes 16 and 17. The head is positioned 0.022 inches below the centerline of tape 14. The erase gap in head 10 is enabled and the tape is started in the foward direction, which movement is continued until the early warning hole 18 is detected. The head is then stepped up 22 steps (0.022 inches) and the tape is rewound to the first set of BOT holes 16 and 17. The steps of enabling the erase gap and starting the tape forward and stepping the head up 22 steps and repositioning the tape to the first step of BOT holes is repeated two more times. The erase gap is 0.024 inches wide so the above operation insures the a band 0.066 inches wide (centered at the centerline of tape 14) is totally erased.

The tape is then positioned to the first set of BOT holes 16 and 17 and the head is stepped so that it is at the nominal centerline of tape 14, which is 0.104 inches below head stop 15. The tape is then started in the forward direction. The read/write head 10 writes four bursts of data about 1.00 inch in length separated by 1.8 inches of unrecorded tape or "inter-record gap". The first burst is positioned approximately 11.7 inches from the first set of BOT holes 16 and 17. The tape is then positioned to the load point and the head is positioned to the nominal track zero position. The nine tracks on the tape may then be recorded at the appropriate location on the tape using the reference signal to accurately position the head at the centerline of each track.

Although the invention has been described in conjunction with the foregoing specific embodiment, many alternatives, variations and modifications are intended to fall within the spirit and scope of the appended claims.

We claim:

1. A method of positioning a read/write head with any one of a plurality of information containing tracks on a recording medium, comprising the steps of:
   locating a first edge of a reference signal on the recording medium;
   locating a second opposed edge of the reference on the recording medium;
   using the locations of the first and second edges to calculate the position of the centerline of the reference signal; and
   using the centerline position as a reference point for positioning the head with respect to a selected one of a plurality of information tracks on the recording medium for facilitating transfer of information between the head and the selected track.

2. The method as set forth in claim 1, wherein:

the steps of locating include locating the first and second edges of the reference signal at the beginning of the recording medium.

3. The method as set forth in claim 1, further comprising the steps of:
scanning the recording medium to detect a reference signal.

4. The method as set forth in claim 1, further comprising the steps of:
writing a reference signal on a recording medium.

5. The method as set forth in claim 1, further comprising the steps of:
scanning a portion of the recording medium to detect the absence or presence of a reference signal.

6. The method as set forth in claim 5, further comprising the steps of:
erasing the portion of the recording medium if no reference signal is located; and
writing a reference signal on the portion of the recording medium.

7. A method of positioning a read/write head with any one of a plurality of information containing tracks on a recording medium, comprising the steps of:
searching the recording medium for the presence of a reference signal;
in the absence of a detected reference signal, writing the reference signal at a preselected location on the recording medium; and
using the location of the reference signal for positioning the head to write signals in information containing tracks at preselected locations.

8. The method according to claim 7, wherein the step of searching the recording medium comprises:
the step of scanning the recording medium adjacent a beginning portion of an information containing track.

9. A method according to claim 7, further comprising the steps of:
when a reference signal is detected locating a second opposed edge of the reference on the recording medium;
using the locations of the first and second edges to calculate the position of the centerline of the reference signal; and
using the centerline position as a reference point for positioning the head with respect to a selected one of a plurality of information tracks on the recording medium for facilitating transfer of information between the head and the selected tracks.

10. A method for positioning a read/write head for transfer of information between the head and a recording medium which has a plurality of information containing tracks, comprising the steps of:
moving the head to a stop point;
moving the head from the stop point a first predetermined distance to a second point spaced from the stop point;
moving the head from the second point a predetermined distance to a third point between the stop point and second point;
scanning the beginning portion of the recording medium to detect the bottom and top of an information containing reference track;
calculating the center point between the top and bottom of the information containing reference track to provide a reference point which indicates the location of each of the plurality of information containing tracks on the recording medium; and
positioning the head for the transfer of information between a selected one of a plurality of information containing tracks.

11. An apparatus for positioning and indexing a read/write head on a multiple track recording medium, comprising:
a drive means and a head means for reading and writing information on a selected one of a plurality of information containing tracks on a recording medium;
said head means having an indexing means to detect a reference track on a portion of the recording medium; and
means for calculating the centerline of the reference track to determine a reference point on the recording medium to accurately indicate the location of each track on another portion of the recording medium to maximize the number of tracks on the recording medium and for accurately reading and writing information on the recording medium.

12. The apparatus as set forth in claim 11, comprising:
a detecting means for locating the portion of the recording medium where the reference signals may be located.

13. The apparatus as set forth in claim 11, comprising:
a control means for actuating the drive means and head means.

14. The apparatus as set forth in claim 11, wherein:
said indexing means has a stepping means to selectively position the head means on the recording medium.

15. An apparatus for positioning and indexing a read/write head on a multiple track recording medium, comprising:
a drive means and a head means for reading and writing information on a selected one of a plurality of information containing tracks on a recording medium;
said head means having an indexing means to detect a reference track on a portion of the recording medium to determine a reference point on the recording medium to accurately indicate the location of each track on another portion of the recording medium to maximize the number of tracks on the recordng medium and for accurately reading and writing information on the recording medium; and
means for writing a reference signal on the first portion of the recording medium in the absence of a reference signal detected by the head means.

16. The apparatus as set forth in claim 15, comprising:
a detecting means for locating the portion of the recording medium where the reference signals may be located.

17. The apparatus as set forth in claim 15, comprising:
a control means for actuating the drive means and head means.

18. The apparatus as set forth in claim 15, wherein:
said indexing means has a stepping means to selectively position the head means on the recording medium.

* * * * *